United States Patent [19]

Yamashita

[11] Patent Number: 4,570,193

[45] Date of Patent: Feb. 11, 1986

[54] VIDEO SIGNAL PROCESSING DEVICE INCLUDING EMPHASIS AND/OR DE-EMPHASIS CIRCUIT

[75] Inventor: Shinichi Yamashita, Kanagawa, Japan

[73] Assignee: Canon Kabushiki Kaisha, Tokyo, Japan

[21] Appl. No.: 374,881

[22] Filed: May 4, 1982

[30] Foreign Application Priority Data

May 8, 1981 [JP]  Japan ................................. 56-68250

[51] Int. Cl.$^4$ ............................................. H04N 5/76
[52] U.S. Cl. .................................. 360/33.1; 358/166; 358/335; 358/340; 333/28 R
[58] Field of Search ............... 358/335, 166, 167, 162, 358/340; 333/28 R, 28 T, 165–166; 360/65, 33.1, 30; 455/43, 63

[56] References Cited

U.S. PATENT DOCUMENTS 3,288,930 11/1966 Johnson ............................... 358/166
3,535,443 10/1970 Rieke ................................... 358/166
4,232,279 11/1980 Prince ................................. 333/166
4,330,769 5/1982 Dean et al. ......................... 333/166

OTHER PUBLICATIONS

Baertsch et al., "The Design and Operation of Practical Charge-Transfer Transversal Filters", IEEE Transactions on Electron Devices, vol. Ed-23, No. 2, 2/76, pp. 133–141.

Primary Examiner—Robert L. Richardson
Attorney, Agent, or Firm—Toren, McGeady, Stanger, Goldberg & Kiel

[57] ABSTRACT

A video signal processing device including emphasis and/or de-emphasis circuit being arranged to have a circuit to emphasize a high frequency component of a video signal which has been introduced at a time of frequency modulation in a linear phase. Further, the circuit clips an output of the emphasis circuit with a prescribed amplitude and at the same time supplies a frequency modulated video signal to a de-emphasis circuit which has a characteristic of being contrary to the frequency characteristic of the emphasis circuit.

7 Claims, 20 Drawing Figures

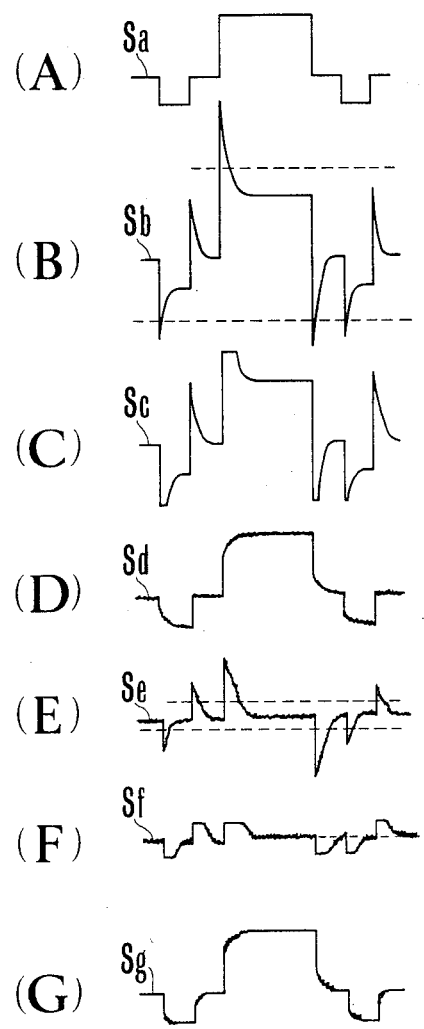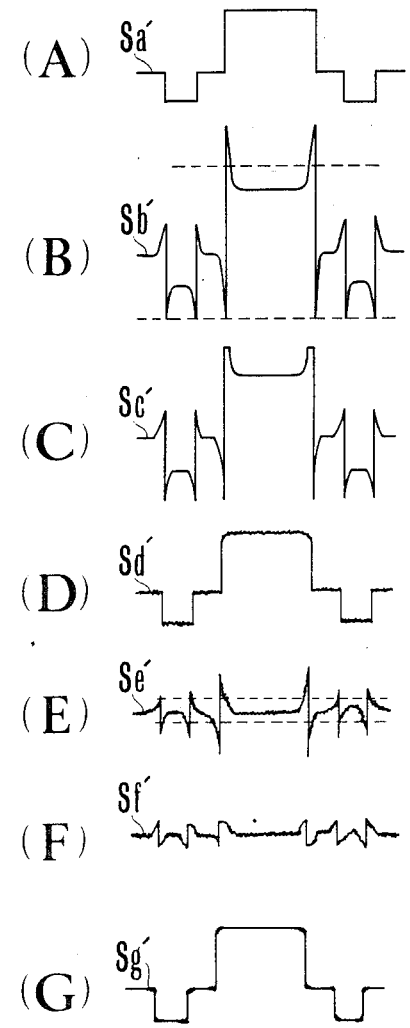

VIDEO SIGNAL PROCESSING DEVICE INCLUDING EMPHASIS AND/OR DE-EMPHASIS CIRCUIT

BACKGROUND OF THE INVENTION

1. Field of the Invention

This invention relates to a video signal processing device and more particularly to a video signal processing device which is arranged to perform an emphasizing process for the magnetic recording of a video signal and a de-emphasizing process for reproduction of a magnetically recorded video signal.

2. Description of the Prior Art

In recording and reproducing a video signal on a magnetic recording tape or the like through frequency modulation by use of a VTR, for example, heretofore the deterioration of the S/N ratio of reproduction picture signal due to noises generated on the magnetic recording tape or the like has been mitigated by emphasizing the high frequency component of the video signal through an emphasis circuit in recording the video signal and by reducing and suppressing the high frequency component through a de-emphasis circuit in reproducing the recording.

In the case of a home VTR in general, a circuit which removes a low level signal portion of the high frequency component of a video signal, has been used.

Referring to FIGS. 1 to 3 of the accompanying drawings, examples of these conventional circuits are as described below:

FIG. 1 shows an example of the conventional circuit for emphasizing in recording a video signal. This example comprises an emphasis circuit consisting of a capacitor C and resistors R and a clipping circuit 2 which is provided for clipping a black and white signal which has the high frequency component thereof emphasized through the emphasis circuit. FIG. 2 shows the conventional circuit arrangement used to de-emphasize a reproduction signal and to perform the noise clipping action. In FIG. 2, the circuit arrangement comprises a de-emphasis circuit 3 which consists of a capacitor C and resistors R; a buffer amplifier 4 which is connected to the rear stage of the de-emphasis circuit 3; a subtractor 5 which is provided for to subtract the value of the output of the buffer amplifier 4 obtained through a high-pass filter 6 and an amplitude limiter 7 from a value of the output of the de-emphasis circuit 3 obtained through the buffer amplifier 4. A noise clipping circuit NC is formed by the subtracter 5, the high-pass filter 6 and the amplitude limiter 7.

The operation of the conventional circuits shown in FIGS. 1 and 2 is as described below with reference to the wave form chart of FIG. 3.

First, an emphasizing action is performed in the following manner: In the emphasis circuit 1, a high frequency emphasizing filter is formed by the capacitor and resistor, C and R. Accordingly, where an input video signal Sa is a signal of a wave form as represented by FIG. 3(A), for example, the output of this emphasis circuit 1 becomes a signal Sb of a wave form as represented by FIG. 3(B) in which overshooting takes place at the rise and fall parts thereof. In the case of a home VTR, a fairly large overshoot peak results from emphasizing a signal of at least about 1 MHz by about 12 to 16 dB. Therefore, frequency modulation of such a signal as it is would result in over-modulation. In such a case there takes place an inversive phenomenon, since the recording band of the tape transport system of a magnetic head is limited to prevent reproduction of high frequency. To prevent this, the clipping circuit 2 for limiting the amplitude of overshooting to obtain a wave form as represented by Sc in FIG. 3(C) before frequency modulation is provided. After that, the signal is recorded on a magnetic tape by a magnetic head.

In reproducing a recording made by a VTR, a signal recorded on a magnetic tape is read out by a magnetic head and is amplified. The amplified signal is then frequency demodulated. The demodulated signal is supplied to the de-emphasis circuit 3. Circuit 3 is a low-pass filter of opposite characteristics to that of the emphasis circuit 1 shown in FIG. 1. The output Sd of the de-emphasis circuit which is of a wave form as shown in FIG. 3(D) becomes about the same as the original signal with the exception of the part limited by the clipping circuit 2. At this time, the components of noises which have been generated by the magnetic tape, magnetic head, etc. and have been distributed within the high frequency zone of the video signal are decreased by the low-pass characteristic of the de-emphasis circuit 3.

Recording with a VTR, however, particularly with a home VTR, is accomplished at a high degree of density, therefore, the S/N ratio of a video signal is insufficient. Hence, the S/N ratio is improved by the provision of the noise clipping circuit NC shown in FIG. 2.

Further, at this time, since the high frequency component at the rise and fall of the video signal has been lost there, the signal Sd shown in FIG. 3(D) is of a wave form in which smearing has occurred to deteriorate the quality of a picture. Further, the white peak portion of the recording signal Sc corresponds to a short wave length portion of a poor S/N ratio in an ordinary magnetic recording tape, the S/N ratio of the reproduced signal Sd is deteriorated for a period of about several $\mu$sec after the rise thereof. This results in a poor S/N ratio at the contour portion of a picture, an undesirable result.

The noise clipping circuit NC shown in FIG. 2 operates as follows: The demodulated, de-emphasized signal Sd is amplified at the buffer amplifier 4 and then passes to the high-pass filter 6 and to the subtracter 5. At the high-pass filter 6, which is normally formed by a capacitor and a resistor, the high frequency component of a video signal Se of a wave form as represented by FIG. 3(E) is taken out. This signal Se is passed through the amplitude limiter 7 to clip the video component to a level which has larger amplitude than the noises. The signal is then supplied to one of the input terminals of the subtracter 5 and is subtracted from the above-stated signal Sd. This offsets the noise component that is not clipped by the amplitude limiter 7. However, at the rise and fall parts of the video signal the output of the amplitude limiter 6, which is in a wave form as shown in FIG. 3(F), the noise component does not appear for a period of several $\mu$sec after the rise and fall, therefore, the noise of these parts remains unremoved.

With the conventional emphasis circuit, de-emphasis circuit and noise clipping circuit, there smear appears at the rise and fall parts of a picture as shown in the output of the subtracter 5 represented by FIG. 3(G). Another shortcoming of the conventional circuits is that the S/N ratio is deteriorated for several $\mu$sec after the rise and fall. In the conventional home VTR, the above-stated shortcoming has been prevented from actually causing a serious problem by giving some allowance to the S/N ratio of the magnetic system thereof by arranging the recording density to have an ample margin. However, recent demands for recording over a long period of time have compelled use of high density recording. Accordingly, the S/N ratio is no longer sufficient. Particularly, the S/N ratio at the contour portions of pictures has impeded the carrying out of high density recording.

SUMMARY OF THE INVENTION

It is therefore a general object of the invention to provide a video signal processing device which is capable of eliminating the above-stated shortcomings of the prior art by minimizing the occurrence of smear at the contour portion of a picture and by giving a sufficient S/N ratio.

It is a more specific object of the invention to provide a video signal processing device which uses a phase linear type transversal filter as the high-pass filter of an emphasis circuit.

Another object of the invention is to provide a video signal processing device using a phase linear type transversal filter as the low-pass filter of a de-emphasis circuit.

It is a further object of the invention to provide a video signal processing device in which the noise clipping circuit also functions as a high-pass filter.

These and further objects, features and advantages of the invention will appear in the following detailed description thereof taken in conjunction with the accompanying drawings.

BRIEF DESCRIPTION OF DRAWINGS

FIGS. 3(A) through 3(G) are wave form charts showing the operating wave forms of the conventional circuits shown in FIGS. 1 and 2.

FIGS. 6(A) through 6(G) are wave form charts showing the operating wave forms of the circuits shown in FIGS. 4 and 5.

DETAILED DESCRIPTION OF PREFERRED EMBODIMENTS

Figure 1:
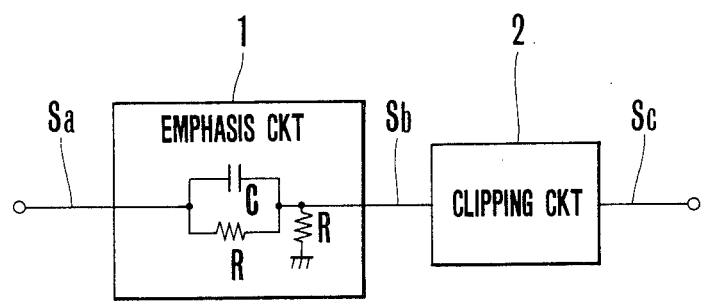
FIG. 1 is a schematic block diagram showing conventional arrangement of an emphasis circuit.
Figure 2:
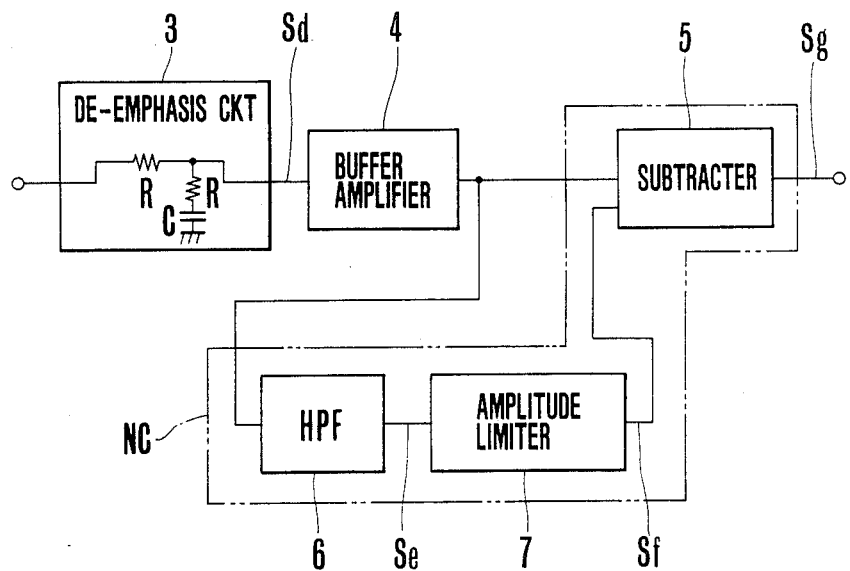
FIG. 2 is a schematic block diagram showing conventional arrangement of a de-emphasis circuit and a noise clipping circuit.
Figure 4:
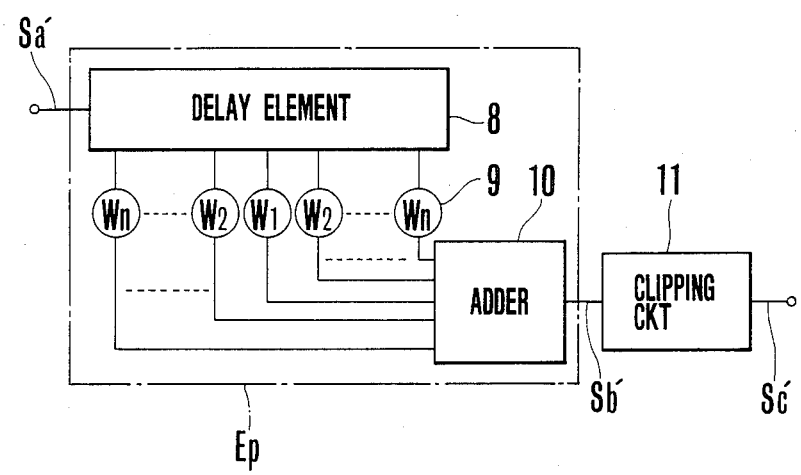
FIG. 4 is a schematic block diagram showing an emphasis circuit of a video signal processing device as an embodiment of the present invention.

An example of the emphasis circuit according to the invention for emphasizing a video signal which is a brightness signal representing black and white in this particular embodiment is as shown in FIG. 4. Referring to FIG. 4, the emphasis circuit Ep is composed of a transversal filter of the phase linear type the operation of which will be described hereinafter. The emphasis circuit Ep comprises an analog delay element 8 which consists of n of time delay elements arranged in n steps; a coefficient imparter 9 which is connected to a plurality of taps provided on the analog delay element 8 for obtaining each delayed output thereof and gives weighting coefficients $W_n$, $W_{n-1}$, ---, $W_1$, ---, $W_{n-1}$ and $W_n$ symmetrically arranged with a center tap set, in the middle of the symmetrical arrangement, in such a way as to have an emphasizing characteristic; and an adder 10 which is arranged to give the sum total of the outputs of the coefficient imparter 9. The emphasis circuit Ep is followed by a black and white clipping circuit which is arranged to clip the output of the emphasis circuit Ep.

Figure 5:
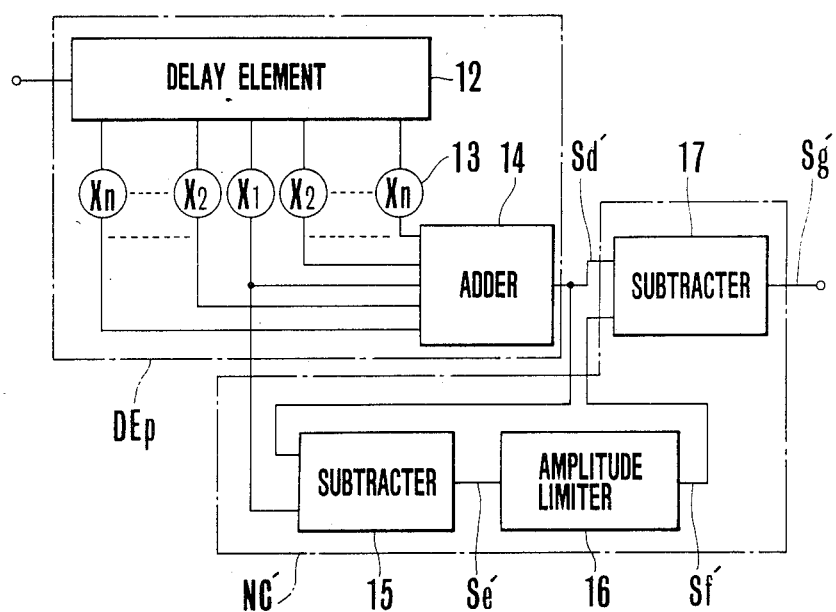
FIG. 5 is a schematic block diagram showing a de-emphasis circuit and a noise clipping high-pass filter of the embodiment.

In FIG. 5 which shows a circuit arrangement for carrying out de-emphasis and noise clipping processes, a de-emphasis circuit DEp is also composed of a phase linear type transversal filter in the same manner as in the above-stated emphasis circuit Ep. This de-emphasis circuit DEp comprises an analog delay element 12 which consists of time delay elements arranged in n number of steps; a coefficient imparter 13 which is connected to a plurality of taps provided on the analog delay element 12 for obtaining each time delay output thereof and gives weighting coefficients $X_n$, $X_{n-1}$, ---, $X_1$, ---, $X_{n-1}$, $X_n$ which are symmetrically arranged with a center tap set, in the middle of the symmetric arrangement, in such a way as to have a de-emphasizing characteristic; and an adder 14 which is arranged to give the sum total of the outputs of the coefficient imparter 13. Reference numeral 15 indicates a subtracter which forms a high-pass filter HPF and is arranged to subtract the output of the coefficient imparter 13 relative to the weight coefficient $X_1$ connected to the center tap of the analog delay element 12 from the output of the adder 14 which corresponds to the output of the de-emphasis circuit DEp. The subtracter 15 is followed by an amplitude limiter 16 which limits the amplitude of the output signal of the subtracter 15 to a predetermined extent. Another subtractor 17 is provided and arranged to subtract the output of the amplitude limiter 16 from the output of the adder 14. The subtracters 15 and 17 and the amplitude limiter 16 constitute a noise clipping circuit NC'.

Referring now to wave form charts shown in FIGS. 6(A) through 6(G), the operation of the embodiment of the invention will be understood from the following description. First, the emphasis circuit Ep operates as follows: In the arrangement shown in FIG. 5, the coefficient imparter 9 imparts a weight to the output of each tap of the analog delay element 8. Then the outputs of the coefficient imparter 9 are added up by the adder 10. As mentioned before, the weighting coefficients of the coefficient imparter 9 are arranged around the center tap. This arrangement, therefore, forms a phase linear type filter. An arbitrary filter characteristic is obtainable by suitably selecting a weighting coefficient, so that the desired emphasis characteristic can be obtained.

When a signal such as Sa' shown in FIG. 6(A) is applied to the delay element 8, the output presents a wave form in which pre-shoots and over-shoots respectively take place at the rise and fall parts of the signal as represented by a wave form S'b shown in FIG. 6(B), since the output of the adder 10 is obtained through a phase linear type filter. In the case of the conventional C and R type emphasis circuit, only an overshoot takes place. The use of the phase linear type transversal filter in accordance with the invention causes the overshoot component to be divided between the rise and fall parts of the wave form, so that the peak can be lessened and the width peak can be narrowed.

Second, the amplitude of the overshoots and pre-shoots is limited by the clipping circuit 11, in the same manner as in the conventional arrangement to prevent over-modulation, and a resultant wave form results, as represented by a signal wave form S'c shown in FIG. 6(C). After that, the signal is frequency modulated by a frequency modulator and is recorded on a magnetic tape by means of a magnetic head.

At the time of reproduction by a VTR, the recorded signal is read out. The signal is amplified and frequency demodulated. The frequency modulated signal is supplied to the de-emphasis circuit DEp and the noise clipping circuit NC' shown in FIG. 5.

The delay element 12, the coefficient imparter 13 and the adder 14 also form a phase linear type transversal filter in the same manner as in the emphasis circuit Ep shown in FIG. 5. Since coefficients of the coefficient imparter 13 are selected to be approximately opposite to the characteristic of the emphasis circuit, the output signal of the de-emphasis circuit presents a wave form which is about the same as the wave form of the original signal as shown in FIG. 6(D). The rise and fall peak values of black and white of the emphasized video signal are smaller than those of the conventional arrangement. Therefore, less of the high frequency component of the video signal is lost at the clipping circuit. Smear also occurs to a less degree. Further, the smaller white peaks result in a lesser degree of deterioration in the S/N ratio of the contour portion of a picture, thus contributing to improvement in the picture quality. The operation of the noise clipping circuit NC' is as follows:

A high-pass filter can be formed to obtain a difference between the demodulated, de-emphasized signal S'd and the signal before the demodulation and the de-emphasis. This is performed by the subtracter 15 and the high frequency component is taken out to obtain a video signal S'e as shown in FIG. 6(E). The center tap is used as one of the inputs to the subtracter. This arrangement is for the purpose of obtaining timing in relation to the other input signal S'd of the subtracter. The signal S'e which is thus obtained is passed through the amplitude limiter 16 to have a video signal portion of larger amplitude than noises clipped. The signal processed through the limiter 16 is supplied to the subtracter 17 and is subtracted from the output signal S'd of the adder 14. By this subtraction, the noise component is offset. At this time, in the same manner as in the conventional arrangement, no noise appears at the rise and fall parts of the video signal in the output S'f of the amplitude limiter 16 while the noise at these parts remains in the output S'g of the subtracter 17. However, unlike the conventional arrangement, the noise residue is divided between times before and after each of the rise and fall parts. With the noise divided in this manner, the noise of the white portion of the picture which tends to become visually conspicuous is shortened and results in a lesser degree of deterioration of picture quality.

Figure 7:
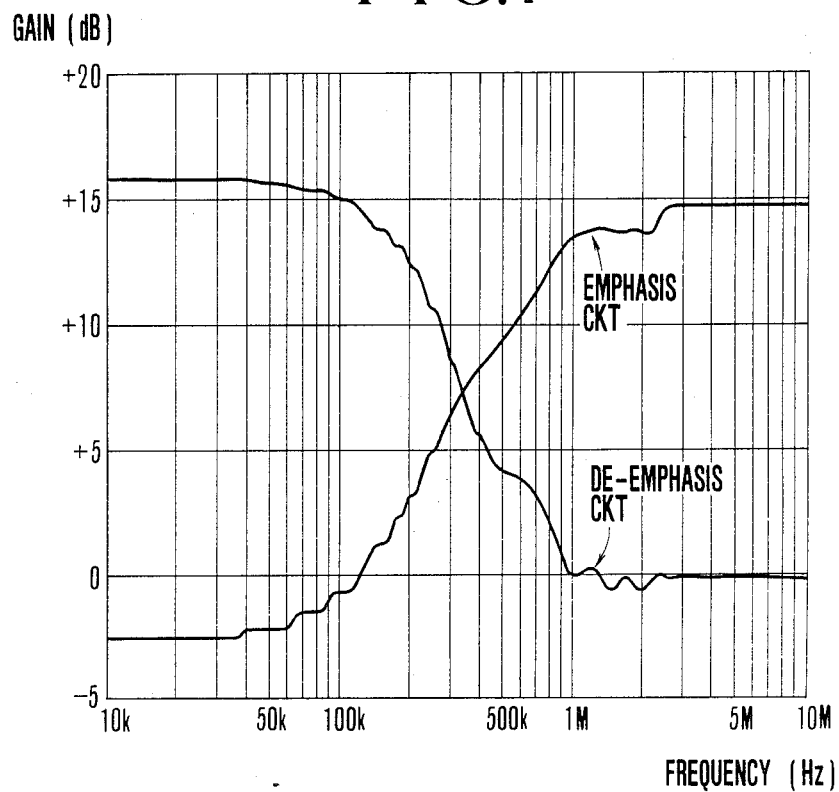
FIG. 7 is a graph showing the frequency characteristics of the emphasis circuit and de-emphasis circuit of the above-stated embodiment of the invention.

An experiment has been conducted to find the frequency characteristics of the emphasis and de-emphasis circuits according to the invention. The results of the experiment are as shown in FIG. 7. In the experiment, the coefficients of the coefficient imparter were set at the following values: $W1=4.84$, $W2=-0.75$, $W3=-0.47$, $W4=-0.29$, $W5=-0.07$, $W6=-0.07$, $W7=-0.02$, $W8=-0.08$, $W9=-0.01$ and $W10=-0.05$. $X1=2.21$, $X2=0.61$, $X3=0.49$, $X4=0.35$, $X5=0.26$, $X6=0.18$, $X7=0.15$, $X8=0.11$, $X9=0.09$ and $X10=0.06$. Further, the total delay time of the delay element was set at 4 $\mu$sec and the delay time between adjoining taps at 207 nano-sec. In FIG. 7, there is a ripple which occurred on the side of high frequency. Reduction in such a ripple is possible, however, by increasing the number of taps. In the experiment, as shown in FIG. 7, transition points in the frequency characteristic are set at 50 KHz and 1 MHz. However, a desired frequency characteristic is obtainable by selecting suitable values of the coefficients and the delay time.

Further, in the above-stated experiment, a transversal filter is formed by the analog delay element, the coefficient imparter and the adder. However, this may be replaced with a transversal filter of the CCD or BBD type using split electrodes for weighting. In that case, all the circuits mentioned in the foregoing can be arranged into an integrated circuit for reduction in size. A specific example of this is as shown in FIG. 8.

Figure 8:
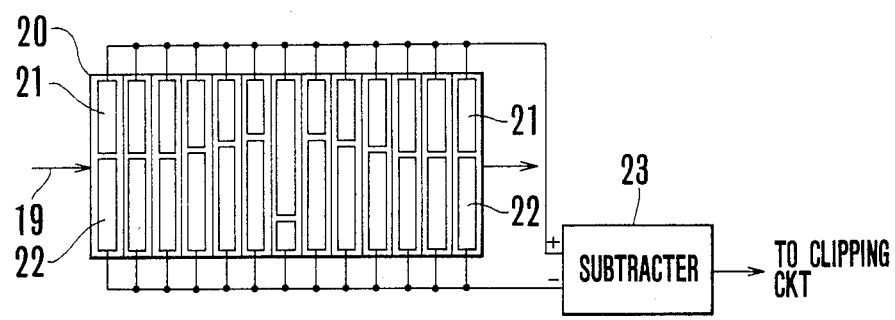
FIG. 8 is a schematic illustration of another emphasis circuit according to the invention.

In FIG. 8, the transversal filter comprises a video signal input line 19; a delay element of the CCD or BBD type; split electrodes 21 and 22 which are divided and attached to the constituent elements of the CCD or BBD element; and a subtracter 23. This arrangement gives a signal proportional to the ratio in size of one of the split electrodes to the other attached to the elements. The arrangement obviates the necessity of providing a coefficient imparter for every delay line. The embodiment as shown in FIG. 8 represents an emphasis circuit. However, a de-emphasis circuit can be arranged in the same manner.

As described in the foregoing, a video signal processing device, according to the invention, uses a phase linear type transversal filter for the emphasis circuit and the de-emphasis circuit. Therefore, compared with the conventional emphasis and de-emphasis circuits using capacitors and resistors, smear occurs to much less of a degree and the problems relative to deterioration of the S/N ratio at the contour portion of a picture, etc. can be solved. The device according to the invention is particularly advantageous for high density recording. Further, the use of the transversal filter gives any desired frequency characteristic. Therefore, the invention is applicable to various kinds of recording apparatuses.

Further, the use of the CCD or BBD transversal filter which performs weighting with the split electrodes in accordance with the invention permits arrangement of the emphasis and de-emphasis circuits into an integrated circuit and simplification of circuit arrangement.

By having the high-pass filter perform a combined function as noise clipping circuit also permits simplification of the circuit arrangement. Further, while these embodiments have been described as applied to recording and reproduction on a magnetic tape, the invention is of course applicable also to a magnetic disc and other recording media.

Although the invention has been described in its preferred forms with a certain degree of particularity, it is to be understood that many widely different embodiments and modifications may be made in the invention without departing from the spirit and scope thereof.

What is claimed is:

1. A video signal processing device including a de-emphasis circuit, comprising:
   (a) a de-emphasis circuit to de-emphasize high frequency components of a de-modulated video signal, said de-emphasis circuit including a transversal filter of a low pass type which includes analog delay elements and a coefficient imparter to impart weight to each tap output of said delay elements; and (b) a noise clipping circuit to eliminate noise components of large amplitude out of output signals of said de-emphasis circuit, said noise clipping circuit including a first subtracting circuit to obtain a difference between one of the delay outputs of each tap of said delay elements and an output of the de-emphasis circuit.

2. A device according to claim 1, wherein said noise clipping circuit further includes an amplitude limiter which limits an amplitude of an output of said first subtraction circuit.

3. A device according to claim 2, wherein said noise clipping circuit further contains a second subtraction circuit which obtains a difference between an output of said amplitude limiter and an output of the de-emphasis circuit.

4. A device according to claim 1, wherein the delay output supplied to the first subtraction circuit is the output from a center tap out of the delay elements.

5. A video signal processing device comprising:
(a) an emphasis circuit including:
a group of delay elements connected in series, to which a video signal which has been introduced to the emphasis circuit is supplied;
a group of coefficient imparters for imparting weight to each tap output of the delay elements; and
an operation circuit which operates outputs of the coefficient imparters to generate a single output, the delay time of each of said group of delay elements and the coefficient of each of said group of coefficient imparters being determined in such a manner that the output signal of the operation circuit represents the video signal introduced to said emphasis circuit and emphasized on the high frequency component in a linear phase; and (b) a clipping circuit for clipping an output signal of said emphasis circuit with a predetermined amplitude.

6. A device according to claim 5, wherein said group of delay elements is formed by a charge transfer device.

7. A device according to claim 5, further comprising a de-emphasis circuit including:
a group of delay elements connected in series and supplied with a video signal introduced to the de-emphasis circuit;
a group of coefficient imparters for imparting weight to each tap output of said group of delay elements; and
an operation circuit for operating outputs of said group of coefficient imparters to generate a single output, the delay time of each of said group of delay elements and the coefficient of each said group of coefficient imparters being determined in such a manner that the output signal of the operation circuit represents the video signal introduced to said de-emphasis circuit and de-emphasized on the high frequency component in a linear phase.

* * * * *